Patented Jan. 24, 1939

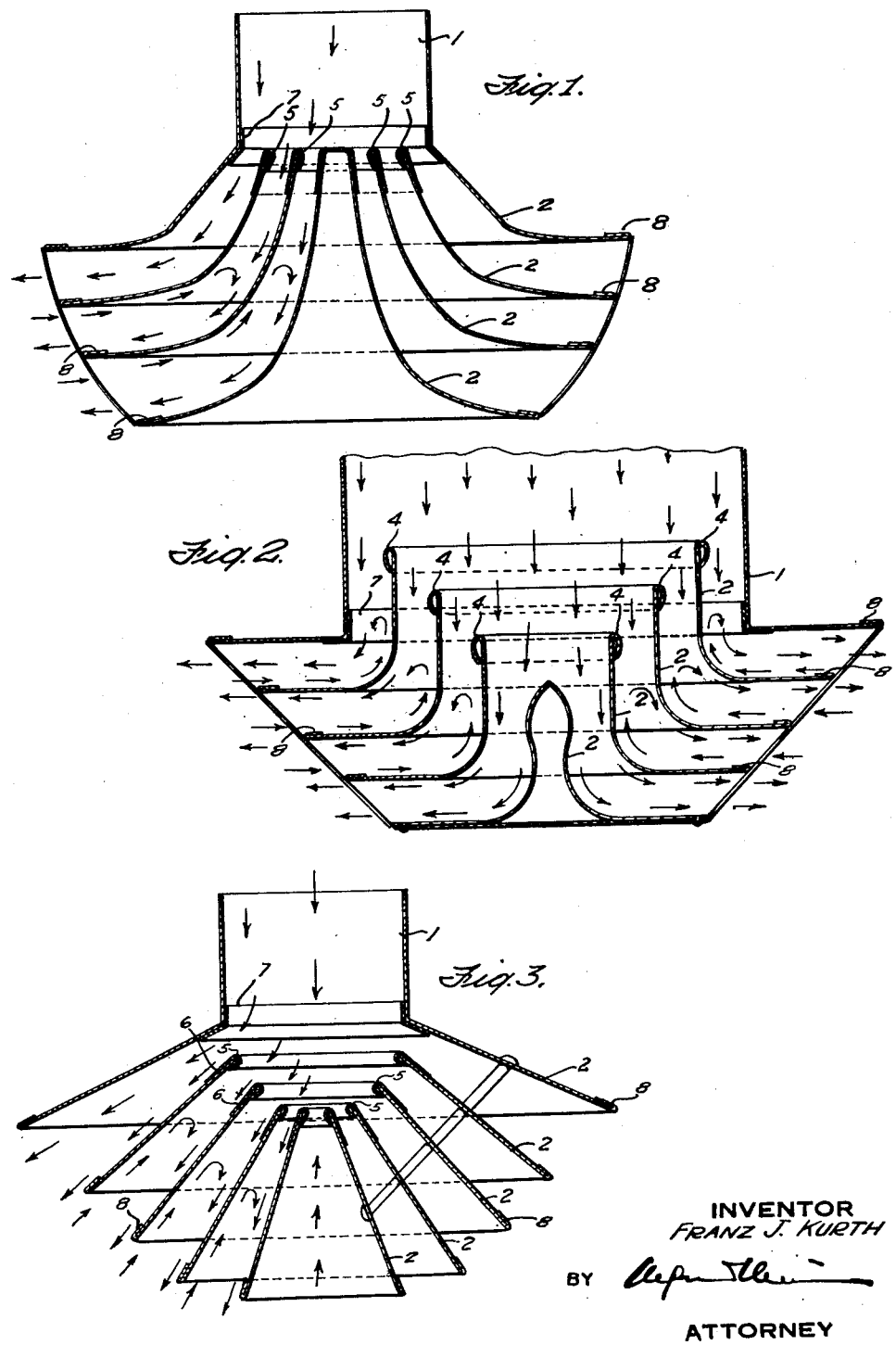

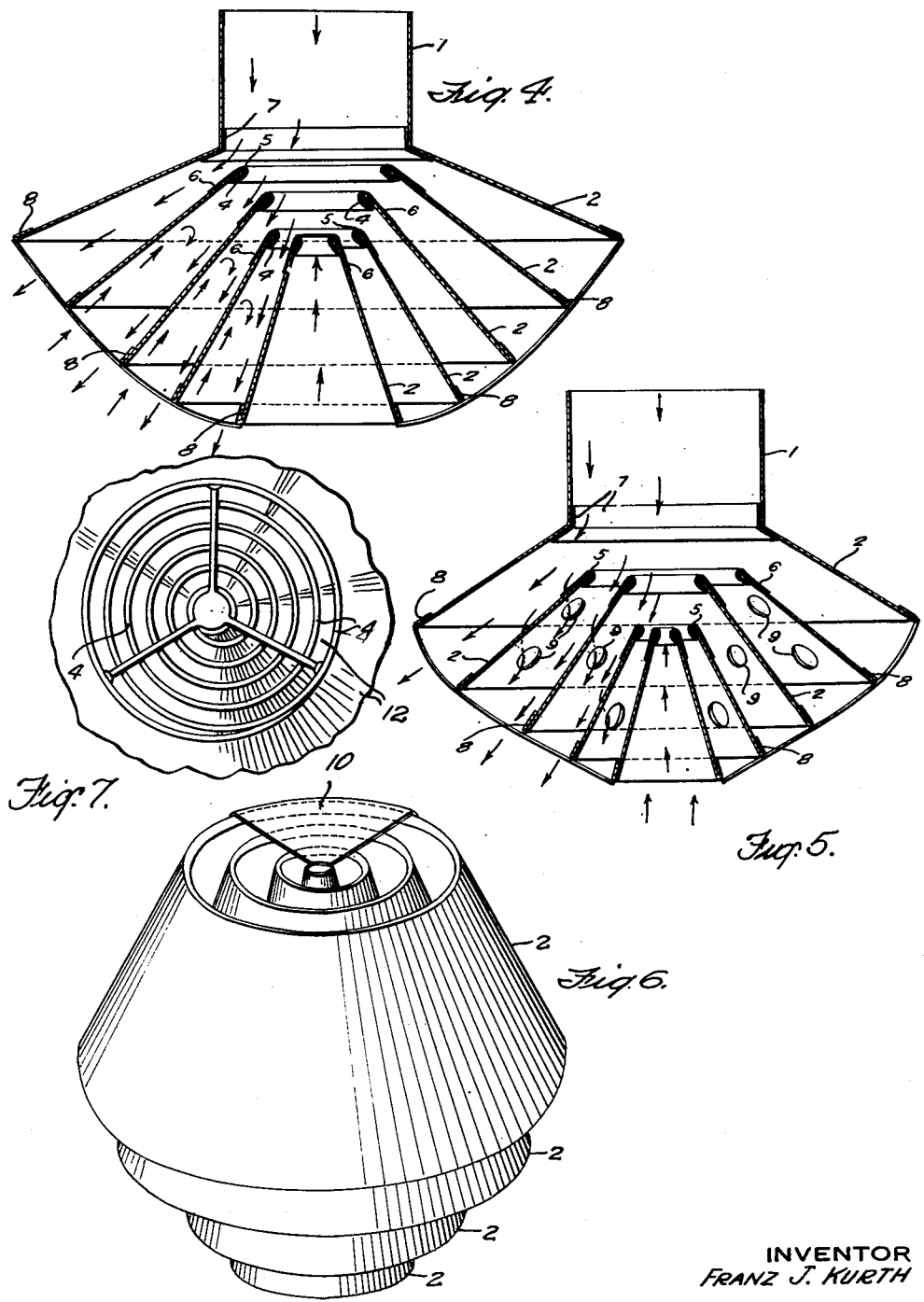

2,144,631

UNITED STATES PATENT OFFICE 2,144,631

AIR DISTRIBUTING DEVICE

Franz J. Kurth, New York, N. Y., assignor to Anemostat Corporation of America, a corporation of Delaware Application August 24, 1936, Serial No. 97,570

4 Claims. (Cl. 98—40)

My invention relates to air or gas distributing devices for introducing air or gas from a conduit into a room or enclosed space without producing the sensation of draft, or for draftlessly directing air or gas from a room or enclosed space into an air or gas outlet conduit, and has particular reference to devices of this kind comprising a plurality of passageways arranged to divide the air or gas into a plurality of separate streams or currents.

In prior devices of the kind referred to the air strikes the edges of the structure or members forming the passageways and, upon reaching or exceeding a certain velocity, sets up vibrations in the structure or members and thereby produces disturbing sounds. Moreover, apart from the vibration and sound caused by the air striking the edges of the said structure or members, some vibration and sound may result from the impingement and friction of the air against the surfaces of the walls or members, particularly if the said walls or surfaces of the members are straight in the direction of flow of the air through the device, as has heretofore generally been the case.

Accordingly, one important object of the present invention is to provide means greatly reducing and practically eliminating vibration and accompanying sound caused by the air or gas striking the edges of the said walls or members in air distributing devices of the character mentioned.

Another important object of the present invention is so to shape the air distributing members themselves as practically to eliminate vibration and sound caused by friction of the air against the surfaces of the air distributing members.

Another important object of the invention is to provide means greatly reducing and practically eliminating vibration and sound caused by impingement of the air against the walls of the structure or the surfaces of the air distributing members.

A further object of the invention is to provide means for the equalization of pressure between the various streams or currents of air flowing through the passageways formed by the walls of the structure or the air distributing members of the device, thereby further reducing resistance to flow of air through the device.

Another object of the invention is to provide means whereby portions of the air passageways of the air distributing device may be closed or blanked so that the air can be directed as desired through the device.

A further object of the invention is to so construct a device of the kind referred to that the air flowing through the passageways of the air distributing device sets up a suction in portions of said passageways to draw into said passageways air from the room or closed space for admixture with the air supplied to the device.

With the foregoing and other objects in view, which will become more fully apparent from the following description, the invention consists in the novel combination and arrangement of parts and features hereinafter described, illustrated in the accompanying drawings and defined in the appended claims.

In the drawings:

Fig. 1 is a central, longitudinal section through an air distributing device constituting one practical embodiment of my invention.

Figs. 2, 3, 4 and 5 are views similar to Fig. 1, illustrating other practical embodiments of the invention;

Fig. 6 is a perspective view illustrating means for controlling the flow of air through the device.

Fig. 7 is a top plan view of a modification.

According to each of the various embodiments of the invention illustrated in Figs. 1 to 6 of the drawings, the device comprises an air inlet, or outlet, conduit, designated 1, and a plurality of mutually spaced hollow members 2 to provide passageways therebetween for the distribution of air flowing through the device, either from or to said conduit 1.

According to Fig. 1 the hollow members 2 are of streamlined contour so that the air flowing through the passageways formed between said members meets a minimum of resistance with consequent reduction in friction and sound. However, while streamlining of the members 2 is preferred, it is not essential, as said members 2 may have walls which are straight or substantially straight in the general direction of flow of air through the device, as illustrated in Figs. 3, 4 and 5, or the walls of said members may have straight portions angularly related to each other and connected together by curved portions as illustrated in Fig. 2.

Regardless of the contour of the walls of the members 2, the edges thereof facing counter to the direction of flow of air through the device either are directly formed or otherwise suitably provided with means to direct the air over said edges practically without producing vibration or sound. Such means may comprise flanges or beads 4 formed by turning or rolling the edge portions of the members 2 upon themselves and serving to reinforce and stiffen said members, or may be comprised by separate elements 5 engaged over the edges of the members 2 and fastened thereto in any suitable manner. In either case the means referred to, whether in the nature of flanges or beads formed directly on the edges of the members 2, or in the nature of separate elements 5, preferably are of streamline shape in cross-section so as further to avoid the setting up of any vibration or sound due to flow of the air thereover. Moreover, if the means referred to is comprised by separate elements 5 these preferably, but not necessarily, are formed from suitable vibration absorbing and sound deadening material, such as rubber, felt or the like. Alternatively, the means referred to may comprise a combination of flanges or beads 4 formed directly on the members 2 by turning the edge portions thereof upon themselves, and elements 5 of rubber, felt or the like engaged over the flanged or beaded edges 4 of said members as shown in Fig. 4.

Air or gas entering either end of the device, by impingement against the sides of the members 2 adjacent to their edges, produces vibration and noise. To overcome this, the sides of the members adjacent to the inner or the outer edges of said members, as the case may be, and against which the incoming air may impinge, are covered by facings 6 of rubber, felt or other suitable vibration absorbing and sound deadening material. These facings may be formed either as integral skirt portions of the elements 5 or as parts separate from said elements, and may be fastened in place upon the surfaces of the members 2 in any suitable manner.

According to each of the embodiments of the invention shown in Figs. 1 to 6 the outermost member 2 forms an outwardly directed continuation of the conduit 1. Therefore, air or gas travelling from the conduit 1 to the passageway between the outermost and the next adjacent member 2, or from said passageway to the conduit 1, takes a curved path around the corner at the junction of the conduit 1 with the outermost member 2. This may result in the production of vibration and sound upon the air reaching or exceeding a certain velocity. Therefore, according to the present invention a facing 7 of rubber, felt or other suitable vibration absorbing and sound deadening material preferably is applied over the corner at the junction of the conduit 1 with the outermost member 2, thus to avoid vibration and sound which otherwise may be produced by flow of air around said corner. Obviously, the facing 7 may extend from said corner into the conduit 1 and the outermost member 2 any desired distances.

Whether the present device is used for draftlessly directing flow of air or gas from the conduit 1 into a closed space or from a closed space into said conduit, the means 4 or 5 or a combination of said means, as the case may be, as well as the facings 6, will, of course be provided at and adjacent to the edges of the members 2 facing counter to the direction of flow of the air or gas. In this connection and in order further to reduce possibility of the members 2 vibrating and producing sound, the edge portions of said members at the opposite or air or gas outlet ends thereof preferably are turned upon themselves as indicated at 8 whereby the members are stiffened and reinforced.

Because of the provision of the means 4 or 5, or a combination of said means, along the edges of the members 2 at the air or gas inlet end of the device, air or gas flowing through the major portions of the passageways between said members sets up a vacuum effect in minor portions of said passageways resulting in a counter-flow of air or gas through said minor portions of said passageways. This is illustrated by the arrows in each of Figs. 1 to 4 and serves the important and beneficial purpose, when the device is used for the delivery of air to a room, of assuring a constant intermixture within the device of part of the room air with the incoming air.

According to Figs. 1 and 2 the members 2 are formed to direct air or gas either laterally outward from, or laterally inward to, the conduit 1, while according to Figs. 3 to 5 the members 2 are formed to direct air or gas more or less both laterally and axially from or to the conduit 1. Moreover, according to each of the embodiments shown in Figs. 1 to 6, the members 2 are disposed in nested relationship. It is to be understood, however, that the members 2 may be formed to direct air other than as illustrated in the representative embodiments of the device shown in the drawings and that said members need not be arranged in nested relationship, but may be disposed entirely in advance of one another or otherwise suitably arranged. Or, as shown in Fig. 7, the air distributing device may be formed of a spiral band having its convolutions 12 opposed to one another and suitably spaced apart to produce passageways for the air or gas.

Fig. 2 illustrates not only that the members 2 need not be of outwardly flaring form and that they may comprise right angularly or substantially right angularly disposed portions connected together by intermediate curved portions, but that the innermost of said members may be of streamline contour, closed at its inner end and provided at its outer end with a lateral flange to direct the incoming or outgoing air or gas laterally outward from, or laterally inward toward, the device as the case may be. On the other hand, each of Figs. 3, 4 and 5 illustrates that the innermost member 2 is open at its ends and that its innermost end is disposed in a plane closely adjacent to the plane of the inner end of the next adjacent member, whereby the flow of air or gas around the inner end of said innermost member, when the device is used for the distribution of air or gas, produces a suction effect through said innermost member as indicated by the small arrows.

Fig. 3 illustrates that the distances between the planes of the inner ends of the members 2 may progressively increase toward the conduit 1. On the other hand, Fig. 4 illustrates that the distances between the planes of the inner ends of the members 2 may progressively decrease toward the conduit 1. Alternatively, Fig. 5 illustrates that the planes of the inner ends of certain of the members 2 may be disposed relatively closely together and that the planes of the inner ends of certain other of said members may be spaced relatively widely apart. In short, Figs. 3 to 5 indicate that any desired spacing of the planes of the inner ends of the members 2 may be employed to obtain desired air or gas distribution in any particular installation of the device. Fig. 5 additionally illustrates that the members 2 may be provided with openings 9 for the purpose of obtaining an equalization of air or gas pressure in the passageways between said members, which equalization of pressure has been found to be of decided advantage in reducing vibration and sound in devices of the present kind. In this connection it will be understood that the openings 9 may be embodied in any other of the illustrated forms of the invention.

Fig. 6 illustrates that a plate or baffle element 10 may be employed to blank portions of the passageways between the members 2 so that the air or gas may be directed through any desired portion of the device. The element or elements 10, as the case may be, may be flanged at its edges for engagement with edge portions of a pair of the members 2 whereby it is retained in place and is mounted for slidable adjustment.

If any one of the devices illustrated is to be used for directing air draftlessly into rather than from the conduit 1, the means 4, 5 and 6 will of course be provided at the outer instead of the inner ends of the members 2, as will readily be understood.

In Fig. 3 there is shown at 11 one of the braces for holding in spaced relationship the hollow members 2. As will be seen, these braces are provided about midway between the inner and outer ends of the hollow members.

From the foregoing description in connection with the drawings, it is believed that the features and advantages of the present improvements in air or gas distribution devices will be fully understood. It is desired to point out, however, that while only certain specific forms of air distribution devices embodying the features of the invention have been illustrated and described, said features are equally capable of embodiment in various other specifically different air or gas distribution devices within the spirit and scope of the invention as defined in the appended claims.

I claim:

1. An air or gas distribution device comprising a plurality of hollow successively larger mutually spaced flaring members arranged to provide separate passageways therebetween for flow of air or gas through the device, an air conduit to which the outermost of said members is connected at one end, and a facing of vibration absorbing, sound deadening material over the inner faces of said conduit and of said outermost member at and adjacent to the junction of said conduit with said outermost member.

2. An air or gas distribution device comprising a plurality of hollow, successively larger flaring members open at their ends and arranged in spaced relationship to provide a plurality of flaring air or gas passageways therebetween, and an adjustable segmental plate disposed over the smaller ends of said members and passageways adapted to blank various portions of said passageways against flow of air or gas therethrough.

3. An air or gas distribution device comprising a plurality of hollow, successively larger flaring members open at their ends and arranged in spaced relationship to provide a plurality of flaring air or gas passageways therebetween, a segmental plate over portions of the smaller ends of said members and passageways blanking portions of said passageways against flow of air or gas therethrough, and. means mounting said plate for rotatable adjustment about the axis of the device so that it may be moved to blank different segmental portions of the passageways.

4. An air or gas distribution device comprising a plurality of hollow, successively larger flaring members open at their ends and arranged in spaced relationship to provide a plurality of flaring air or gas passageways therebetween, streamlining means for the edges of said members facing counter to the direction of flow of air or gas through the device, said means comprising cross sectionally streamlined elements of vibration absorbing and sound deadening material engaged over said edges of said members, and skirts formed as integral portions of said elements and providing facings overlying those portions of said members against which air or gas entering the device impinges.

FRANZ J. KURTH.